UNITED STATES PATENT OFFICE.

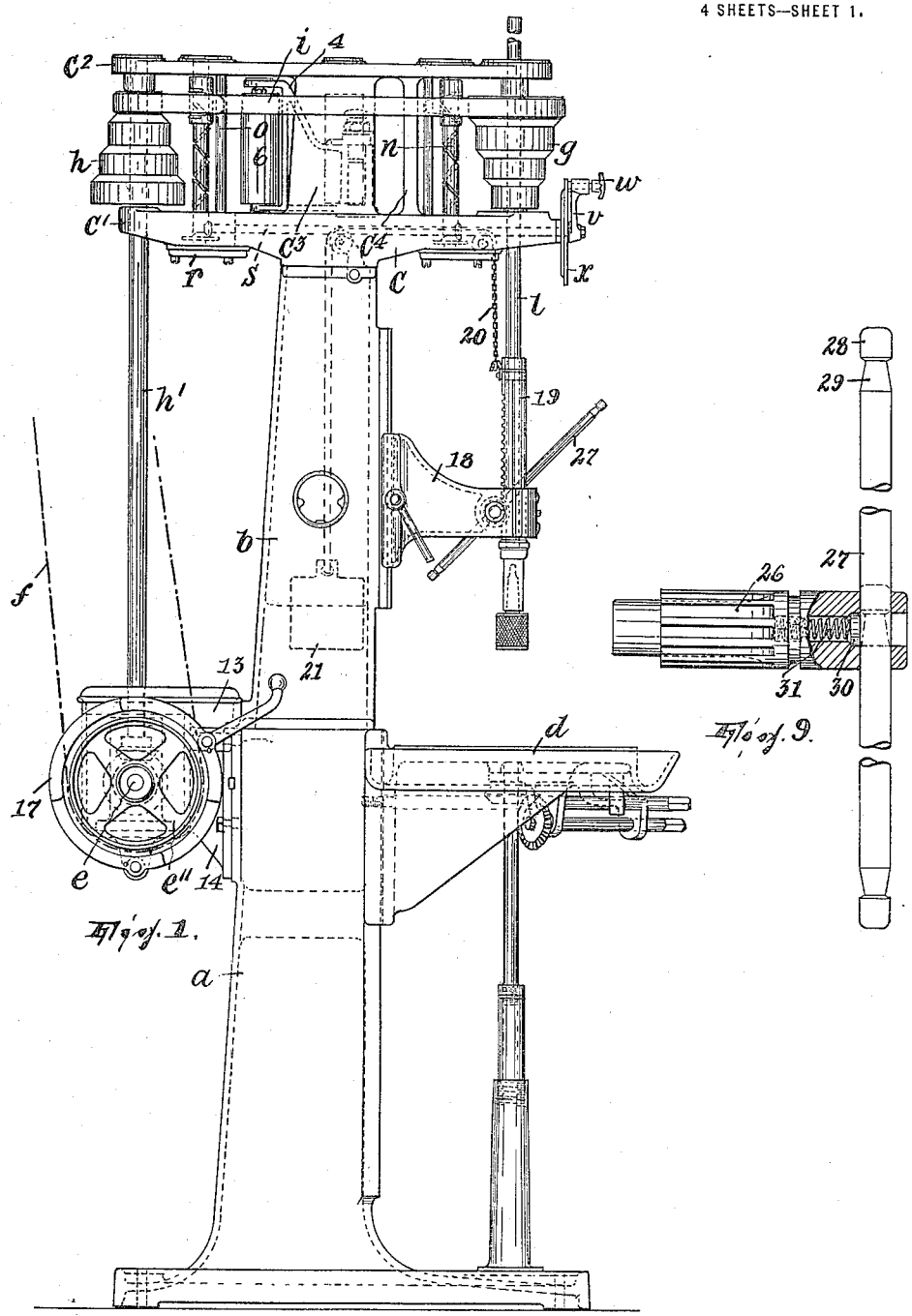

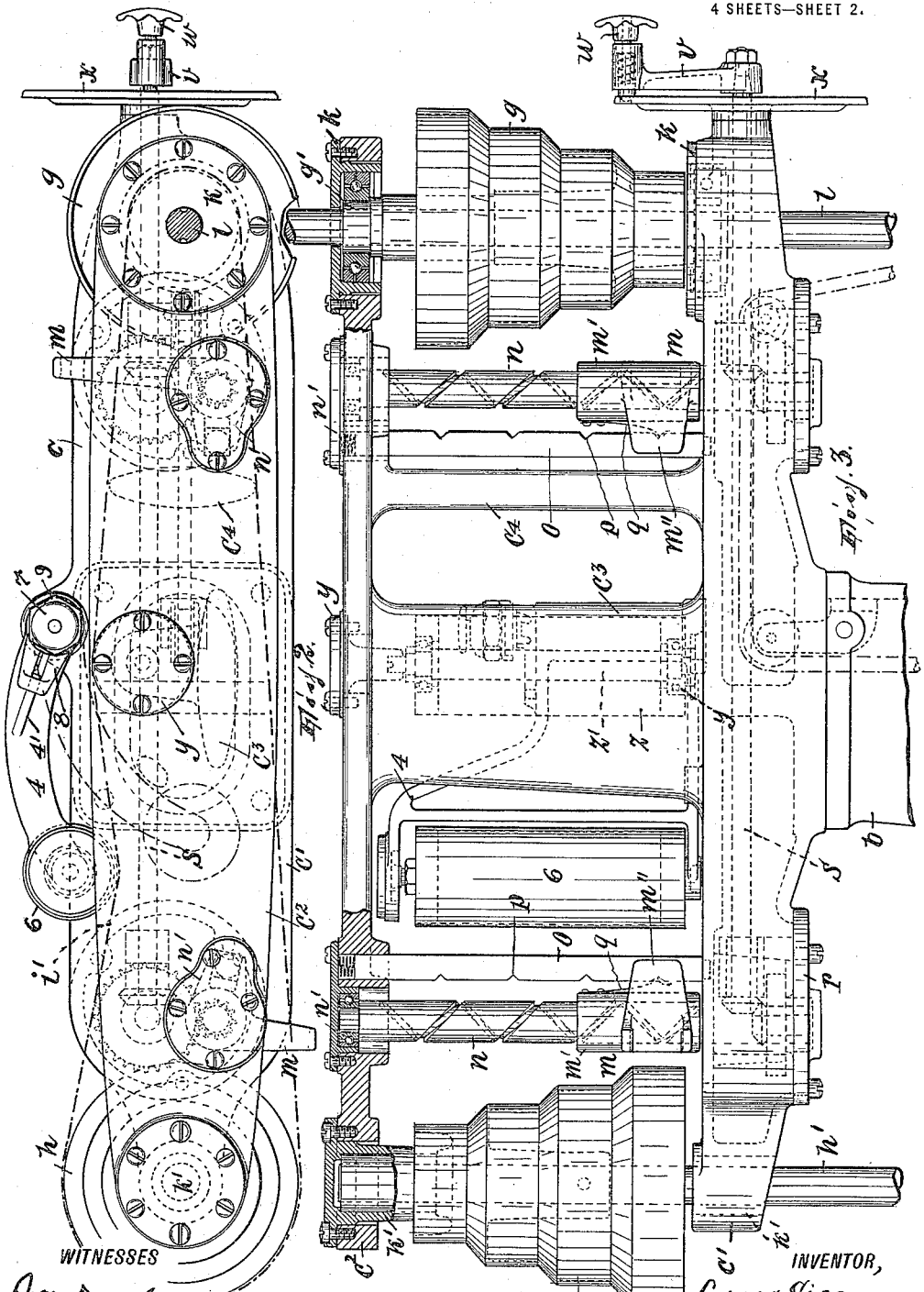

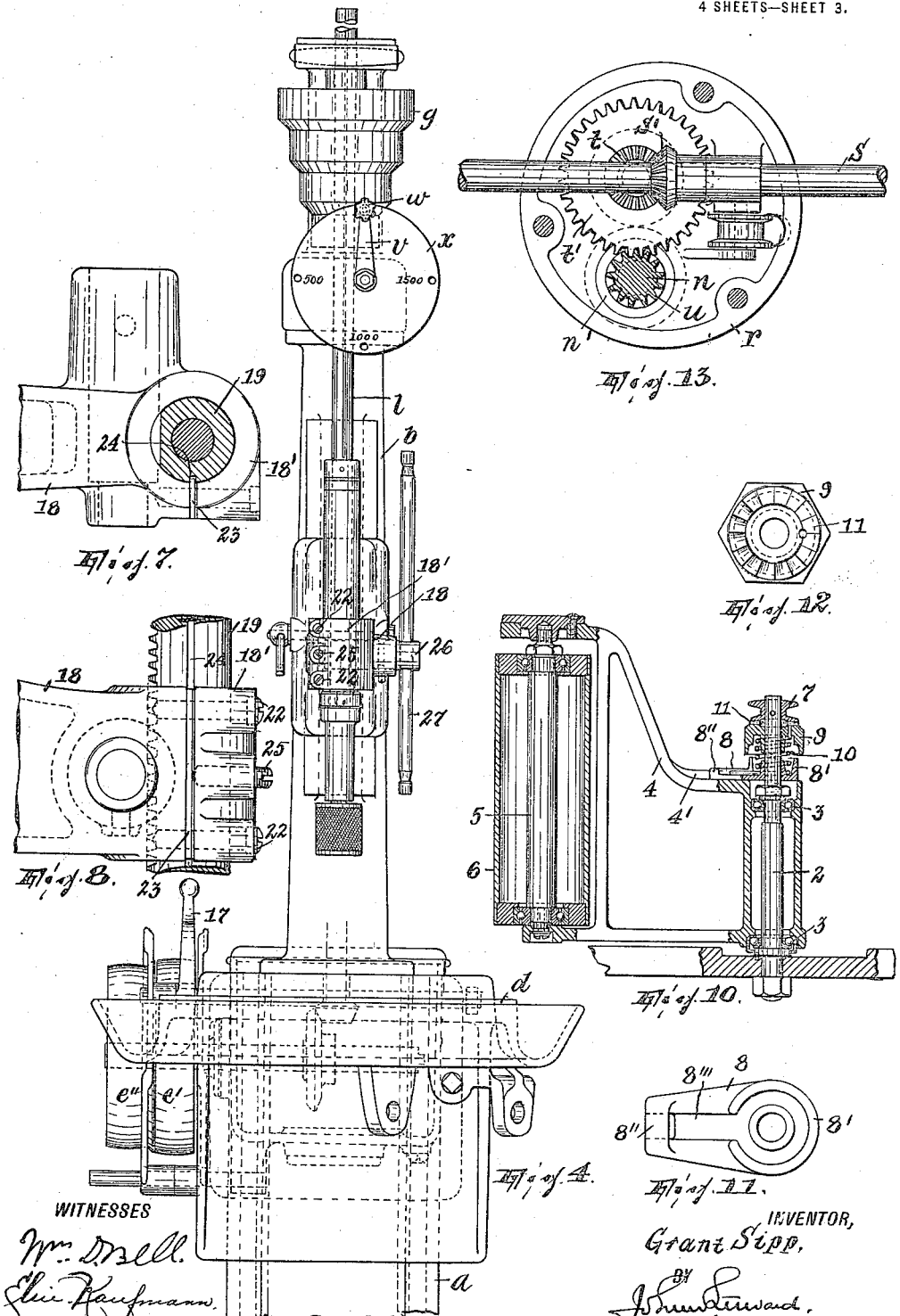

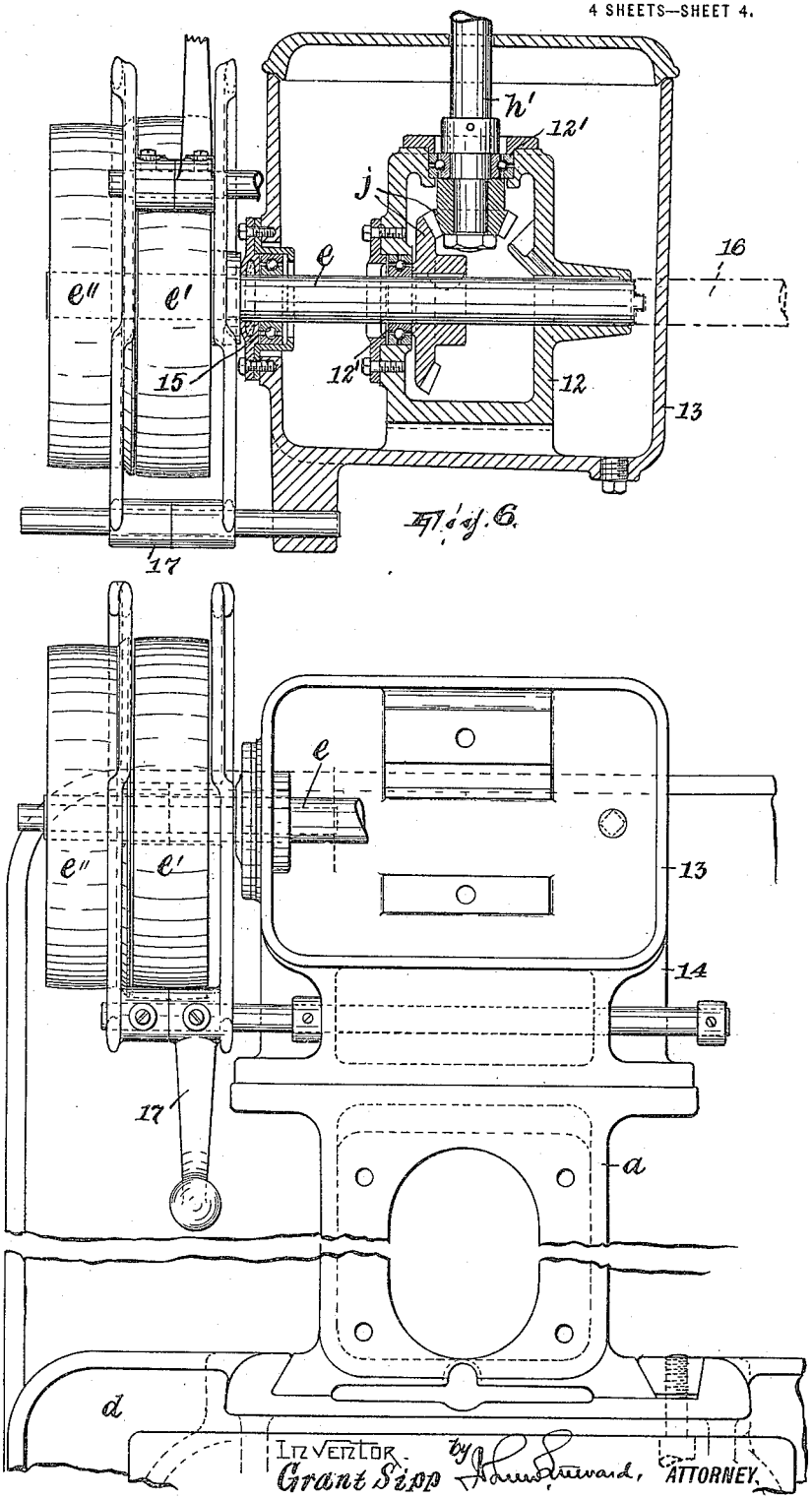

GRANT SIPP, OF PATERSON, NEW JERSEY.

VARIABLE-SPEED GEARING.

1,167,440.   Specification of Letters Patent.   Patented Jan. 11, 1916.

Application filed February 14, 1914. Serial No. 818,794.

*To all whom it may concern:*

Be it known that I, GRANT SIPP, a citizen of the United States, residing at Paterson, in the county of Passaic and State of New Jersey, have invented certain new and useful Improvements in Variable-Speed Gearing, of which the following is a specification.

This invention relates to drill-presses and particularly to drill-presses of the so-called sensitive type. It is highly desirable in such machines to obtain readily any of at least three different speeds of the drill-spindle, regardless of possible provisions for further changes afforded in the means for transmitting the power into the machine; to have the power-transmitting means contained in the machine of such a character (impossible by the use of gearing) as not to limit the spindle-velocity; that such power-transmitting means shall not be of a belt-including type that necessitates the use of idlers and other accessories requiring several operations to be effected by a skilled hand each time the belt is changed in adjusting the machine for a change in speed and more or less constant surveillance to preserve it in the condition for obtaining full efficiency with loss in up-keep of belts due to wear and tear incident to their improper adjustment by careless or unskilled hands, danger of causing injury to the attendant in the attempt to effect belt-adjustment while the machine is running, and loss of time incident to the stopping of the machine due to belt-troubles.

The state of the art of drill-presses reveals that these desiderata have been recognized by those skilled therein; but it also reveals that no drill-press has yet been suggested which is at once capable of being driven at extremely high or low spindle-velocities, has an ample number of speed-changes, may be advantageously left to the independent care of whoever is at least capable of running it, has full spindle-driving efficiency, and is free of the causes responsible for loss in belt-upkeep.

This invention therefore has for its object to provide a drill-press with a transmission mechanism characterized, first, by the use of a belt and therefore permitting any velocity to be imparted to the spindle, however high or low; second, by the mounting of this belt upon reverse parallel cone-pulleys, whereby to allow speed-changes by the simple operation of shifting the belt, by a direct and single movement, from one to another of the pulley-steps and the employment of a belt-shifting means that is simple and self-contained in construction, and to make unnecessary the employment of idlers or other accessories maintaining twists or turns in the belt that necessarily increases the wear and tear thereon, require skilful adjustment in order to keep the belt in proper relation to the driving and driven members in the transmission mechanism, complicate the machine and generally impair the fully successful operation thereof; third, by the employment of means for maintaining the belt in effective contact at all times with the driving and driven members of such transmission mechanism whereby, regardless of speed, the transmitting efficiency of the mechanism will be kept at the maximum; and finally such a disposition in a drill-press of an organism characterized by the foregoing elements as shall conduce to simplicity, durability, strength and facility of control, and of assembling and disassembling.

A further object of the invention is to improve the construction of the mechanism controlling and through which are effected the movements of the drill-spindle.

In the accompanying drawings, in which the preferred form of my improved drill-press is shown, Figure 1 is a side elevation thereof; Fig. 2 is a top plan view of the superstructure; Fig. 3 is a side elevation of such superstructure, partly in section; Fig. 4 is a front elevation of the press; Fig. 5 is a fragmentary plan view of the base-including portion of the machine, showing only a part of the means whereby the power is introduced into the machine; Fig. 6 is a vertical sectional view through the base-including portion of the machine in a plane coincident with the shafts $e$ and $h'$; Fig. 7 is a top plan view and Fig. 8 a side elevation of the arm in which slides the sleeve which is moved vertically for raising and lowering the spindle, such sleeve appearing in Fig. 8 in side elevation and the spindle and sleeve in section in Fig. 7; Fig. 9 shows in side elevation, partly in section, the rotary device whereby the vertical movements of the drill-spindle are manually effected; Fig. 10 is a vertical sectional view of a part of the means for preserving the belt under tension; Figs. 11 and 12 are details of Fig.

10; and, Fig. 13 is a plan view of a part of the belt-shifting means.

On the pedestal $a$ of a suitable base stands a pillar $b$ surmounted by a head $c$ (to be described in detail), the parts $a$ and $b$ and $b$ and $c$ being secured together in any suitable manner.

$d$ is a work-table arranged at the front of the base $a$ and provided with suitable means for raising and lowering it.

The power is introduced into the machine through a shaft $e$, journaled as hereinafter explained; this shaft may be driven by any suitable means, it being shown in the present instance as carrying fast and loose pulleys $e'$ and $e''$, around which extends a belt $f$.

The head $c$ includes spaced superposed elongated horizontal members $c'$ and $c^2$ integrally joined by the broad but relatively thin uprights $c^3$ and $c^4$ set so that the breadth of one extends longitudinally and that of the other crosswise of the heads $c'$, $c^2$, the two uprights being approximately over the pillar $b$ so that between the ends of the members $c'$ and $c^2$ forward and rearward of the uprights there exists appreciable free space. In these spaces are arranged on vertical axes the reversed stepped cone-pulleys $g$ and $h$, around which extends a driving belt $i$. The pulley $g$ is removably fixed on a hollow shaft or sleeve $g'$, and the pulley $h$ on a shaft $h'$ which extends downwardly and at its lower end is geared with the shaft $e$ by the miter gears $j$ (Fig. 6). Bearing boxes $k$, preferably containing antifriction bearings, afford journals in the head members $c'$ and $c^2$ for the hollow shaft $g'$ of pulley $g$; the shaft $h'$ is journaled in suitable bearings $k'$ in the two head-members $c'$ and $c^2$. The bearing boxes $k$ and bearings $k'$ in the two head-members are removable, so as to allow removal of shafts $g'$ and $h'$ and the pulleys. By providing two head-members each pulley is revolubly supported both above and below, so that the belt can have no influence to strain either shaft $g'$, $h'$.

Penetrating the hollow shaft $g'$ is the drill-spindle $l$, splined thereto so as to rotate therewith and be capable of vertical movement independently thereof.

For changing the speed of the spindle $l$ I provide for shifting the belt $i$ vertically. Thus: $m$ denotes two forked shifters respectively receiving the two stretches of the belt and respectively arranged close to the two pulleys $g$ and $h$. The sleeve portions $m'$ of these shifters form nuts which are penetrated by and engage the threading of rotary screws $n$ journaled in suitable bearings $n'$, as shown in Figs. 2, 3 and 13, the upper bearings $n'$ being removable to allow removal of the screws $n$; to preserve the nuts against rotation, each has a fork $m''$ receiving a rod $o$ set at its ends in the head-members $c'$ and $c^2$, each such rod having opposite the different steps on the adjoining pulley a corresponding number of notches $p$ with which engages a spring $q$ on the nut to hold the latter at any elevation to which it may be adjusted. In plates $r$ which are removably secured to the under side of the member $c'$ (and include the lower bearings $n$) is journaled the horizontal shaft $s$. This shaft is connected with each of the screws $n$ by a bevel pinion $s'$ on the shaft meshing with a bevel pinion $t$ formed integral with or fixed to a gear $t'$ journaled in the plate $r$ and meshing with pinion $u$ on the screw $n$. The two belt-shifters $m$ being initially in the same relative positions on the screws $n$, on turning the shaft $s$ it will be apparent that said belt shifters will be caused to move vertically in synchrony, so that the positions to which the belt may be shifted are all parallel to each other.

One complete rotation (in the present instance) of the shaft in either direction will effect shifting of the belt from the top to the bottom, or vice versa, of the pulleys $g$—$h$; and for turning the shaft $s$ and providing means whereby the extent of the rotation effected will indicate the speed of the spindle with a given speed of the shaft $h'$ I provide at its forward end the crank $v$ fixed thereto and having a spring-pressed handle $w$ which forms a pawl to engage in the notches of a stationary dial $x$, which notches may be marked "500", "1000", "1500" and "2000", or otherwise, to indicate the number of revolutions per minute of the spindle with the handle $w$ in registry with one of such notches. By providing two shifters, arranged respectively close to the pulleys, the belt not only yields readily to the shifting effort but is saved considerable wear and tear and stretching that it would otherwise undergo.

In suitable bearings $y$, the upper one of which is removable, (Figs. 2 and 3) is journaled the rotary spindle $z'$ of a roller $z$, the same being placed approximately midway between the two pulleys—in the present instance to one side of the upright $c^3$, which is offset toward the observer in Fig. 2 relatively to the longitudinal central vertical plane of the head-members $c'$ and $c^2$ so as to promote compactness. The roller $z$ forms the fixed one of two members which coöperate to preserve the necessary tension on the belt $i$ by maintaining a bend therein as indicated in Fig. 2 at $i'$, the other of which members will now be described: Referring to Figs. 10, 11 and 12, 2 is an upright stud fixed in the head-member $c'$ and affording at 3 a fulcrum for a forked arm or lever 4 carrying in its forked portion a removable spindle 5 on which is suitably journaled a roller 6. To the upper end of the stud 2 is fixed a head 7.

8 is a block having a cup-shaped portion 8' which is penetrated by the stud and also having a yoke 8" which fits over a rib 4' on the arm 4 so that the block turns with the arm. Between the block 8 and the head 7 is interposed a cup-shaped nut 9 which forms with the cup-shaped portion 8' a housing for a spiral spring 10, one end of which is fixed to the nut and the other held in a groove 8''' in the block 8. The members 7 and 9 have ratchet teeth 11 and thus form coöperating clutch members, member 9 being held against member 7 by the spring 10, the tension of which to normally turn the arm 4 toward the position shown in dotted lines in Fig. 2 may be varied by rotatively altering the position of member 9 with reference to member 7.

The position of the stud 2 with reference to the roller $z$ is such as to allow one stretch of the belt, as the latter is slipped down over the head $c$ of the machine onto the pulleys $g$ and $h$, just to pass between the fulcrum portion of the arm 4 and said roller, the arm being held back beyond the position shown by full lines in Fig. 2 at this time. After the belt is applied, the arm is released and the spring 10 acts to hold it more or less in the position shown by full lines in said figure, where the rollers $z$ and 6 coact to maintain the bend $i'$ necessary to take up any slack in the belt and preserve its full transmitting efficiency, the yielding character of the one of the two belt tension members allowing it to shift as the belt is shifted over the steps of the pulleys or the speed of the belt or other circumstances require. The tension of the belt is altered to suit the resistance opposed to the rotation of the tool held by the drill-spindle by adjusting the nut 9 to alter the pressure of the yielding tension member 4.

In view of the foregoing it will be apparent that the described organization of the means for transmitting power from the shaft $h'$ to the drill-spindle is such that the range of velocity of the drill-spindle is practically unlimited, due to the use of a belt; that the driving efficiency of the belt is substantially invariable, due to the use of means to preserve it always in tension; and that the adjustment necessary to alter the velocity of the drill-spindle is reduced to the simple operation of turning the shaft $s$, due to the employment of parallel reverse cone pulleys receiving the belt. I am cognizant that in power-transmission broadly it is neither new to employ reverse driving and driven parallel cone pulleys connected by a belt; nor to provide means for shifting such belt along the pulleys; nor to preserve the belt always in tension by yielding means, so as to conserve a substantially constant tractive effort. But to place an organism, self-contained or unitary in respect to these elements, wholly in the head of a drill-press, with the axes of the pulleys vertical, and preferably coaxial with the means on the one hand for driving the one pulley and with the spindle on the other hand driven by the other pulley, and provide means to shift the belt equal stages, and simultaneously, with respect to both pulleys and yielding means to preserve the belt always in tension, is not only novel but exceedingly advantageous as producing a more simple and compact construction, greatly increasing the efficiency of the machine, reducing to the minimum the surveillance and repairs necessary to keep it in proper working condition, and practically eliminating the chief causes of injury to the workman, all in the particulars already noted or at once apparent to those familiar with machines of this character.

The shafts $h'$ and $e$ are preferably journaled in a bearing box 12 provided with the anti-friction bearings 12' for said shafts and secured to the bottom of a lubricant well 13 forming part of a casting 14 that is bolted to the back of the pedestal $a$. The bearings 12' and gears $j$ run submerged in the oil with which the well 13 is filled. The shaft $e$ projects at one end through one wall of the well, which may have a stuffing box and anti-friction bearing 15 at this point and at its other end may be formed with means whereby to clutch it with another section 16 of a line of sectional shafting of which it may form a part in the case where two or more of the machines are arranged side by side.

17 is a belt shifter for the belt $f$, suitably supported on the casting 14.

18 is the arm for guiding the sleeve 19 in which is swiveled the drill-spindle, and 20 and 21 the chain and weight by which the sleeve and spindle are counterpoised. In the novel construction of the arm and sleeve shown in Figs. 7 and 8 the arm, whose sleeve-embracing portion 18' is split, is provided with screws 22 for contracting said portion into snugly fitting relation to the sleeve. A hardened plate 23, forming a feather and entering a spline 24 in the sleeve, is received in the split of the arm, being penetrated by the screws and held fixed by another screw 25 tapped into the arm and set up against one face of said plate. By manipulating the screws 22 and 25 a nice adjustment of the split part of the arm to the sleeve, so that the latter will slide freely but without lost motion, may be obtained, the screws then holding the feather plate fast. By this construction, the feather plate, which is always held against the permanent or rigid back face of the split, keeps the sleeve always in a definite relation to the means for raising and lowering it, so that their intermeshing teeth wear evenly.

The sleeve, having rack teeth as shown, is adapted to be manually raised and lowered to change the elevation of the spindle by the rotary toothed member 26 journaled in the aforesaid arm and meshing with said teeth. The handle for turning said member is a bar 27 penetrating it radially and longitudinally slidable therein and having at each end a head 28 and a reduced portion or neck 29 tapering toward the head. To hold the bar in the position to which it may be longitudinally shifted in order to obtain a desired purchase thereon, a plug 30, housed in the member 26, is held against the bar by a spiral spring 31. When the bar is slid longitudinally in the member 26 the plug shifts to the angle of the taper of the neck 29 and, abutting the head, acts as a detent, returning to its original parallel relation to the bar when the bar is returned.

Having thus fully described my invention, what I claim as new and desire to secure by Letters Patent is:—

1. In a drill-press, the combination of the frame having a head, a pair of power-transmitting devices journaled in the head and including reverse cone-pulleys having substantially vertical axes, a depending rotary spindle driven by one of said devices, means to drive the other of said devices, a power-transmitting endless belt extending around the pulleys, means to shift the belt equal stages, and simultaneously, with respect to both pulleys, and yielding means to preserve the belt always in tension.

2. In a drill-press, the combination of the frame having a head, a pair of power-transmitting devices journaled in the head and including reverse cone-pulleys having substantially vertical axes, a rotary spindle coaxial and rotative with and depending from one of said devices, the other of said devices including a shaft depending from and coaxial and rotative with the pulley thereof, means, coupled with the depending part of said shaft, for rotating said other device, a power-transmitting endless belt extending around the pulleys, means to shift the belt equal stages, and simultaneously, with respect to both pulleys, and yielding means to preserve the belt always in tension.

3. In a drill-press, the combination of a pillar, a head surmounting the pillar and including superposed spaced horizontally extending head members and an upright portion rigidly connecting each member between its ends with the other member, a pair of power-transmitting devices journaled on vertical axes in both of, and including reverse cone-pulleys each arranged between, said head members, one of said devices being arranged on one side and the other on the opposite side of said upright portion, a spindle depending from and driven by one of said devices, means for driving the other of said devices, a power-transmitting belt extending around the pulleys, and means to shift the belt lengthwise of said axes.

4. In a drill-press, the combination of a pillar, a head surmounting the pillar and including superposed spaced horizontally extending head members and an upright portion rigidly connecting each member between its ends with the other member, a pair of power-transmitting devices journaled on vertical axes in both of, and including reverse cone-pulleys each arranged between, said head members, one of said devices being arranged on one side and the other on the opposite side of said upright portion, a spindle driven by one of said devices, means for driving the other of said devices, a power-transmitting belt extending around the pulleys, yielding means to preserve the belt always in tension movably mounted on the lower head member and affording clearance between itself and the other head member for the passage of the belt in applying the latter to and removing it from the pulleys, and means to shift the belt lengthwise of the pulley axes.

In testimony whereof I affix my signature in presence of two witnesses.

GRANT SIPP.

Witnesses:
JOHN W. STEWARD,
WM. D. BELL.

Copies of this patent may be obtained for five cents each, by addressing the "Commissioner of Patents, Washington, D. C."